United States Patent
Brambs et al.

(10) Patent No.: US 12,547,143 B2
(45) Date of Patent: Feb. 10, 2026

(54) METHOD FOR DETERMINING A TOOL PATH AND METHOD FOR MATERIAL-REMOVING MACHINING OF A WORKPIECE AND ASSOCIATED MACHINE TOOL AND COMPUTER PROGRAM PRODUCT

(71) Applicant: OPEN MIND Technologies AG, Wessling (DE)

(72) Inventors: Peter Brambs, Munich (DE); David Bourdages, Québec (CA); Hans-Ulrich Armbruster, Unterhaching (DE)

(73) Assignee: OPEN MIND Technologies AG, Wessling (DE)

( * ) Notice: Subject to any disclaimer, the term of this patent is extended or adjusted under 35 U.S.C. 154(b) by 444 days.

(21) Appl. No.: 18/074,080

(22) Filed: Dec. 2, 2022

(65) Prior Publication Data
US 2023/0176541 A1    Jun. 8, 2023

(30) Foreign Application Priority Data
Dec. 2, 2021 (DE) .................. 10 2021 131 830.0

(51) Int. Cl.
*G05B 19/402* (2006.01)
*B23Q 15/12* (2006.01)
(52) U.S. Cl.
CPC .......... *G05B 19/402* (2013.01); *B23Q 15/12* (2013.01); *G05B 2219/36342* (2013.01)
(58) Field of Classification Search
CPC .. B23Q 15/12; G05B 19/402; G05B 19/4093; G05B 19/40937; G05B 19/4097;
(Continued)

(56) References Cited

U.S. PATENT DOCUMENTS

2006/0291969 A1* 12/2006 Koch ............... G05B 19/40937
409/132
2007/0038531 A1* 2/2007 Lukis ..................... G06Q 50/04
705/26.4
(Continued)

FOREIGN PATENT DOCUMENTS

DE        10144508 B4 *  6/2012  .......... G05B 19/402
DE    102013112232 B3     3/2015
(Continued)

OTHER PUBLICATIONS

Search Report issued by the German Patent Office for German Patent Application No. 10 2021 131 830.0, dated Aug. 9, 2022.
(Continued)

*Primary Examiner* — Kidest Worku
(74) *Attorney, Agent, or Firm* — Bradley Arant Boult Cummings LLP; Henry B. Ward, III

(57) ABSTRACT

A method is provided for material-removing machining when moving a tool of a machine tool along a tool path, including providing a workpiece comprising a first workpiece portion and a second workpiece portion adjacent to the first workpiece portion, wherein the tool path comprises a first path section comprising path segments adapted to a geometry of the first workpiece portion, and a second path section comprising path segments adapted to a geometry of the second workpiece portion. The method comprises determining the first path section to cover the first workpiece portion except for a first edge section, determining the second path section to cover the second workpiece portion except for a second edge section, and determining a transition section of the tool path to cover the first edge section and the second edge section, such that the first and second path sections and the transition section cover the entire first and second workpiece portions.

22 Claims, 9 Drawing Sheets

(58) Field of Classification Search
CPC ...... G05B 19/4099; G05B 2219/35097; G05B 2219/36342; G05B 2219/45145
See application file for complete search history.

(56) References Cited

U.S. PATENT DOCUMENTS

| | | | | |
|---|---|---|---|---|
| 2014/0205387 A1* | 7/2014 | Norstedt | ............... | B23C 5/2208 |
| | | | | 407/35 |
| 2017/0246728 A1* | 8/2017 | Beaucamp | ........... | B24D 13/142 |
| 2020/0016669 A1* | 1/2020 | Brambs | ................ | B23C 5/1009 |
| 2021/0356938 A1* | 11/2021 | Schneider | ............ | G05B 19/416 |

FOREIGN PATENT DOCUMENTS

| | | |
|---|---|---|
| DE | 10 2016 214 439 A1 | 2/2018 |
| DE | 10 2016 117 932 A | 3/2018 |
| DE | 102018127821 A1 | 5/2020 |
| EP | 2952990 A1 | 12/2015 |

OTHER PUBLICATIONS

Extended European Search Report issued for Registration No. 22210078.6-1205, Patent No. 4191350, dated Jul. 5, 2023.

* cited by examiner

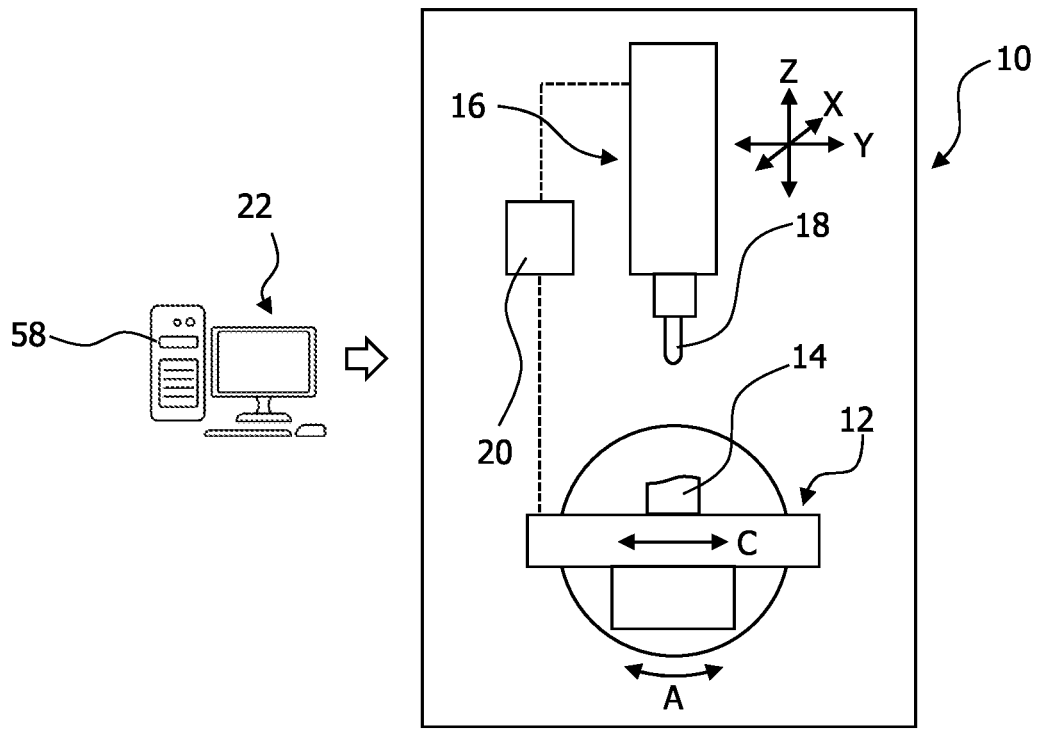
Fig. 1
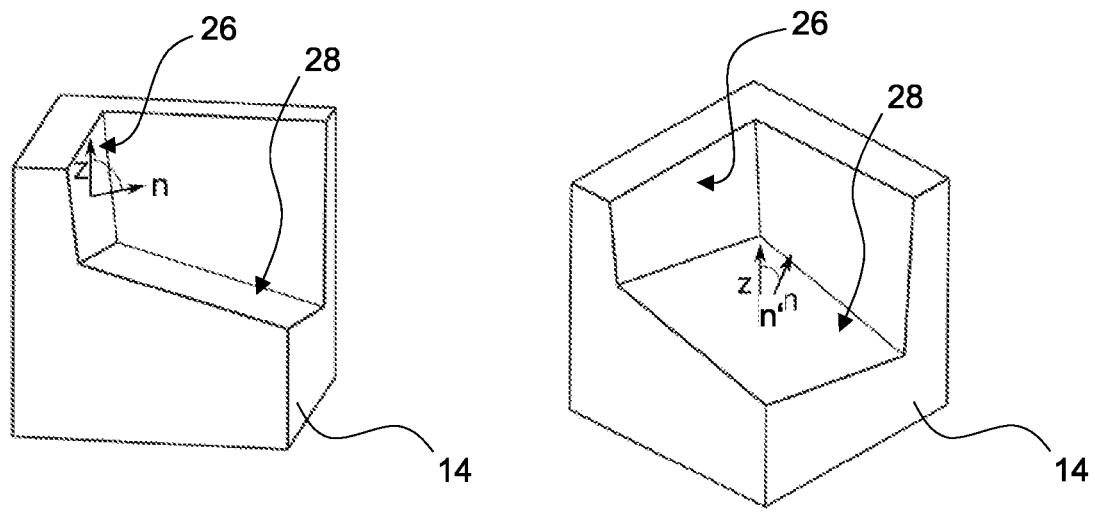
Fig. 2
Fig. 3

METHOD FOR DETERMINING A TOOL PATH AND METHOD FOR MATERIAL-REMOVING MACHINING OF A WORKPIECE AND ASSOCIATED MACHINE TOOL AND COMPUTER PROGRAM PRODUCT

FIELD OF THE INVENTION

The invention relates to a method for determining a tool path for material-removing machining of a workpiece in a machine tool. The invention further relates to a computer program for implementing such a method and to a computer program product having a storage medium on which program code of such a computer program is stored. The invention further relates to a method for material-removing machining of the workpiece.

BACKGROUND THE INVENTION

When machining complex components, different milling strategies can be used for different areas of the component. For example, in the case of finishing, the choice of machining strategy for a particular area of a component may depend, among other things, on its local surface inclination. The component is often divided into areas that can be described as "steep" or "flat". The flat and steep areas can then be assigned a different strategy that takes into account different inclination. The division into flat and steep areas can be performed, for example, by using an appropriate critical angle. Flat areas are surfaces or surface sections having an inclination angle that is smaller than the critical angle; steep areas are surfaces or surface sections having an inclination angle that is greater than the critical angle. It may also happen that a transition between a flat and a steep area is located within a single surface, for example in the case of a curved surface including steep and flat sections.

For many machining situations, plane-by-plane finishing ("Z-level" machining) can be suitable for machining steep areas. In this case, planes parallel to each other along the z axis of the NC coordinate system, for example at a constant distance, are placed through a component model and cut with the steep surfaces. Based on the resulting cutting contours, tool paths can then be calculated on which a tool machines the contours.

When component areas are flat, on the other hand, a different strategy is often chosen, for example a projection method in which a regular two-dimensional path pattern is projected onto the respective surfaces in the direction of the z axis.

It should be noted that the machining strategy selected for flat or steep areas would be less suitable for the respective other type of area since the path segments obtained would diverge strongly due to significantly different inclination. Therefore, different methods for determining path segments of a tool path are combined. To achieve machining of the entire workpiece in such a combination, the path segments of the different areas, or their envelope contours, are added to each other without gaps.

BRIEF SUMMARY OF THE INVENTION

The invention is based on the awareness that in such a procedure, machining in connecting portions, for example in a portion where a steep and a flat area of the workpiece merge or are adjacent to each other, takes place with a great deal of material engagement because the tool enters an area which is not yet completely machined. For example, if a steep area is machined first using a plane-based strategy before projection-based machining of an adjacent flat area takes place, there will still be a lot of material at the bottom of the connecting portion when the tool reaches the end of a plane-based machining line. The invention is further based on the awareness that the space available in connecting portions is often limited, which means that short and/or strongly curved retraction segments must be used, which may lead to abrupt movements of the tool. Both may cause vibrations, considerable tool engagement and the formation of machining marks, which may reduce the quality of the surface. The invention is further based on the awareness that a similar situation may occur upon moving along connecting segments between machining lines that are close to a connecting portion. In this case too, there may not be enough space to create sufficiently smoothly curved path segments along which the tool can be lifted in a controlled manner. This may result in reduced quality, too. In general, accuracy errors of a machine may have a greater effect when space is tight.

Based on the prior art, the present invention is thus based on the task of specifying an improved method for machining workpieces having workpiece portions which are to be machined using different machining strategies. In particular, the invention is based on the task of increasing surface quality and/or reducing the load on the tool and/or machine.

According to the invention, this task is solved by a method having the features of claim 1, a computer program having the features of claim 16, a computer program product having the features of claim 17, and a method having the features of claim 18.

A method is proposed for determining a tool path for material-removing machining of a workpiece in a machine tool by moving a tool along the tool path. The machine tool may be a CNC machine and/or a three, four or five-axis machine. In some embodiments, the tool is a milling tool.

The workpiece may include a first workpiece portion and a second workpiece portion adjacent to the first workpiece portion. The first workpiece portion and the second workpiece portion may have different spatial orientations. Alternatively or additionally, they may differ by at least one boundary condition, such as the presence or absence of other adjacent surfaces and/or objects, a material condition, a desired machining strategy, etc. The tool path may comprise a first path section for machining the first workpiece portion, comprising path segments adapted to a geometry of the first workpiece portion by means of a first adaptation strategy. The tool path may comprise a second path section for machining the second workpiece portion, comprising path segments adapted to a geometry of the second workpiece portion by means of a second adaptation strategy that is different from the first adaptation strategy.

The method may comprise determining the first path section in such a way that the path segments of the first path section cover the first workpiece portion except for a first edge section that is specifically omitted by the path segments of the first path section although in particular path segments would be adaptable to the first edge section by means of the first adaptation strategy. In other words, the method comprises determining the first path section in such a way that the path segments of the first path section effect and/or define machining of the first workpiece portion except for the first edge section. In particular, the first edge section may be directly adjacent to the second workpiece portion.

The method may further comprise determining the second path section in such a way that the path segments of the second path section cover the second workpiece portion except for a second edge section that is specifically omitted by the path segments of the second path section although in particular path segments would be adaptable to the second edge section by means of the second adaptation strategy. In other words, the method comprises determining the second path section in such a way that the path segments of the second path section effect and/or define machining of the second workpiece portion except for the second edge section. In particular, the second edge section may be directly adjacent to the first workpiece portion and/or the first edge section.

The second adaptation strategy may differ from the first adaptation strategy by at least on of (i) the type of generated path segments and (ii) the orientation of the tool along the generated path segments.

Applying the first adaptation strategy to the first workpiece portion may lead to the adaptation of the path segments of the first path section to the geometry of the first workpiece portion and may in addition generate information regarding an orientation of the tool and/or an inclination of the tool. The orientation of the tool may vary along the first path section. The first adaptation strategy may contain a set of rules for determining path segments as well as corresponding tool orientations and/or tool inclinations.

Applying the second adaptation strategy to the second workpiece portion may lead to the adaptation of the path segments of the second path section to the geometry of the second workpiece portion and may in addition generate information regarding an orientation of the tool and/or an inclination of the tool. The orientation of the tool may vary along the second path section. The second adaptation strategy may contain a set of rules for determining path segments as well as corresponding tool orientations and/or tool inclinations.

Within the scope of this disclosure, applying an adaptation strategy to a workpiece portion may lead to the adaptation of path segments of a respective path section to the geometry of the workpiece portion and may in addition generate information regarding an orientation of the tool and/or an inclination of the tool. The orientation of the tool may vary along the respective path section. The adaptation strategy may contain a set of rules for determining path segments as well as corresponding tool orientations and/or tool inclinations.

The method may further comprise determining a transition section of the tool path, comprising path segments covering at least the first edge section and the second edge section, wherein the path segments of the first path section, the second path section and the transition section collectively cover the entire first workpiece portion and the entire second workpiece portion. In other words, the method comprises determining a transition section of the tool path, comprising path segments that effect and/or define machining of the first edge section and the second edge section.

The features according to the invention help to achieve an improved method for machining workpieces having workpiece portions to be machined using different strategies. This also helps to improve surface quality. In addition, load on the tool and/or the machine used can be reduced. By omitting the edge sections according to the invention and specifically determining a transition section, excessive material engagement upon reaching the transition section can be avoided. This allows machining a workpiece connecting portion that is covered by the transition section in a gentle manner and at high quality. Sufficient space can be created to produce approach/retraction segments that are gently curved and/or optimized in terms of a machining quality. This enables the error-free and full production of the desired component geometry, without machining errors in the transition section in particular.

The method differs from rest machining methods in particular by specifically omitting edge sections. For example, the transition section is not a residual material machining section and/or it is not used to machine a residual material section.

It is understood that the steps of the method mentioned herein are completed in the order in which they are mentioned. In other embodiments, however, the order of the steps of the method may differ, at least to the extent possible as there might be certain prerequisites for certain steps of the method.

The path segments of the transition section may be adapted to a geometry of the workpiece, such as a geometry of a connecting portion of the workpiece, by means of a third adaptation strategy that is different from the first adaptation strategy and/or the second adaptation strategy.

The tool path may be generated in particular by means of software and/or a computer system that can be used independently of the machine tool. For example, a CAM system may be used. The method may include the creation of NC code as control commands for controlling machine axes of a machine tool, in particular in the framework of post-processing.

It is understood that any cutting machine tools and any corresponding tools fall within the scope of the invention. The machining may be cutting machining. The machining may comprise milling, drilling, grinding, etc., as well as correspondingly suitable tools.

The tool path is in particular a path along which a defined point of the tool and/or a tool contour of the tool is moved. This may be, for example, a center point, a contact point, a specific point on a tool cutting edge and/or a specific point on a tool axis.

In particular, the two workpiece portions are directly adjacent to each other. According to some embodiments, the first workpiece portion and the second workpiece portion have significantly different spatial orientations. This may mean that a surface normal of the first workpiece portion and a surface normal of the second workpiece portion form an angle of at least 10°, at least 20°, at least 30°, at least 45° or even at least 60°. Said surface normals may be average surface normals of the respective workpiece portion, any surface normal at a point of the respective workpiece portion and/or a surface normal at a characteristic point of the respective workpiece portion such as at its center of gravity, saddle point, inflection point, extremum, midpoint, etc. This may also include the fact that the workpiece portions merge into one another, for example via a fillet surface. Surface normals along a boundary line between the workpiece portions may then correspond to each other. Nevertheless, surface normals at center points and/or at characteristic points, in particular outside the fillet surface in each case, may have significantly different orientations as described. The first workpiece portion may be an entire workpiece surface of the workpiece and as such, on each side, adjoin another workpiece surface that can be distinguished and is geometrically offset from the first workpiece portion. Alternatively or additionally, this may also apply to the second workpiece portion. In other words, the first workpiece portion may be a first workpiece surface and/or the second workpiece portion may be a second workpiece surface. Furthermore, a workpiece portion could also comprise a plurality of surfaces and/or surface parts. In other embodiments, the first workpiece portion and/or the second workpiece portion may be a surface section of a larger surface. Moreover, the two workpiece portions may be part of a common surface and may merge into one another in a continuous and/or tangent-continuous and/or curvature-continuous manner.

In some embodiments, the first adaptation strategy is a plane-based adaptation strategy or a projection-based adaptation strategy. In some embodiments, the second adaptation strategy is a plane-based adaptation strategy or a projection-based adaptation strategy. The first adaptation strategy and the second adaptation strategy may be fundamentally different from each other, i.e., for example, not transferable by a choice of prefactors, boundary conditions, parameter ranges, etc. For example, one of the adaptation strategies may be plane-based and one of the adaptation strategies may be projection-based. The first adaptation strategy may, for example, provide path segments that are plane-based such that machining in the first path section is plane-based, and/or the second adaptation strategy may provide path segments that are projection-based such that the second path section is based on a projection of a path pattern onto the second workpiece portion. In some embodiments, said adaptation to the geometry of the respective workpiece portion includes defining the respective path segments in such a way that they follow the geometry of the respective workpiece portion and cause and/or define the complete machining thereof in the covered section. The adaptation strategies may also be different in the way that different tool inclinations are used, while, in particular, the same method is used to calculate the path segments.

According to the invention, the first edge section and the second edge section may be selected to cover (partial) portions of the workpiece which would be machinable by expanding the first path section and/or the second path section. In particular, there is a deliberate/specific/intentional omission of the edge sections, which could in principle be avoided.

The transition section can cover a transition portion/connecting portion of the workpiece, within which the two workpiece portions adjoin and/or merge into one another. In particular, the path segments of the transition section define and/or effect machining of the workpiece in this transition portion/connecting portion.

According to one embodiment of the invention, the first workpiece portion is a steep portion relative to a spatial axis, the surface normal(s) of which is/are inclined at more than a first critical angle relative to the spatial axis. Alternatively or additionally, the second workpiece portion may be a flat portion whose surface normal(s) is/are inclined at less than a second critical angle relative to the spatial axis. The surface normal(s) is/are in particular (a) surface normal(s) at contact points and/or touch points of the tool. The first critical angle and the second critical angle may be identical, which means that only one critical angle is used. However, different critical angles may be used. As a rule, one of the workpiece portions is a steep portion while the other workpiece portion is a flat portion. The method can thus be applied in particular to the machining situations outlined at the beginning, in which a workpiece is to be machined that has significantly differently oriented workpiece portions that can be described as flat and steep respectively.

In one embodiment, the method further comprises comparing at least one geometrical parameter, in particular a radius, of the tool with a geometrical parameter, in particular a curvature radius, describing a connecting portion of the first workpiece portion and the second workpiece portion. The geometrical parameter of the tool may also be a curvature radius of a cutting edge of the tool. This may refer to any curved portion of the cutting edge, such as a corner radius in a radius milling cutter, a short and/or long semi-axis of an elliptical cutting edge portion, a curvature radius of a bulged section of a conically convex tool, etc. The connecting portion may be formed by the first workpiece portion and/or the second workpiece portion. The two workpiece portions may, in particular, be contiguous to each other without gaps. In such case, the connecting portion is a portion where the two workpiece portions merge into each other and/or a section near a boundary line between the workpiece portions. In other words, a suitable threshold value and/or a suitable user specification can be used to automatically determine whether the workpiece portions are to be machined in accordance with a tool path determined in accordance with the invention. The comparison may be based on a threshold value. The threshold value may be set by a user. A high degree of efficiency can be achieved, in particular, if the comparison serves to determine whether or not the omission of the edge sections and/or the determination of the transition section are to be performed. If, for example, the tool radius and/or a curvature radius of a cutting edge of the tool or another geometrical parameter of the tool is smaller, in particular significantly smaller, for example by a multiple, than the curvature radius of the connecting portion, it may be expedient to perform machining without specifically omitting the edge sections. This may not reduce quality when the tool moves along the connecting portion. For example, a factor of at least 1.5, at least 2, at least 3 or at least 5 as well as an additional or alternative factor a user may set can be provided. If, however, the curvature radius of the connecting portion is similar to or even smaller than the geometrical parameter of the tool, machining beyond the connecting portion may not be possible without further ado. In such case, the above-mentioned strategy of specifically omitting edge sections for different path sections as well as determining a transition section may be useful.

The space gained by omitting the edge sections can be utilized to great advantage in the generation of tool paths that contribute to high surface quality and/or gentle machining if the method further comprises a determination of connecting segments and/or approach segments and/or retraction segments, which are at least partially included in the transition section, for the first path section and/or for the second path section. The connecting segments and/or approach segments and/or retraction segments are in particular part of the respective path section. In other words, if required, the tool may be permitted to move into the transition section when machining of the workpiece takes place in portions that are covered by the first path section and/or the second path section. The connecting segments and/or approach segments and/or retraction segments may at least partially cover and/or extend into and/or overlap the connecting portion.

The transition section is reached when the tool is moved along the tool path, in particular after the first path section and the second path section. In other words, machining first takes place in the first and second path sections before machining takes place in the transition section. This means that the transition section may also serve for post-processing or smoothing out of boundary areas of the two path sections.

According to one embodiment, the method may further comprise determining the transition section in such a way that its path segments at least partially overlap the first path section and/or the second path section. Generating a smooth transition, this helps to achieve high machining quality where approach and retraction movements occur and/or in connecting segments between machining lines of the first and second path sections. In addition to machining a connecting portion that has not yet been machined, the transition section can thus also effect post-processing of workpiece portions that have already been machined in accordance with the first path section and/or the second path section. Smooth transitions can be achieved in particular if the path segments of the transition section are determined in such a way that they are gradually lifted from the workpiece where they overlap the first path section and/or the second path section. The transition section can effect smoothing out of boundary areas of those workpiece portions that are covered by the first path section and/or the second path section.

A particularly efficient determination of the transition section can be achieved, for example, if the method further comprises determination of the first path section by determining preliminary path segments that are, in particular, based on coverage of the entire first workpiece portion by means of the first adaptation strategy, and subsequent shortening of the preliminary path segments in the first edge section. Alternatively or additionally, the method comprises determination of the second path section by determining preliminary path segments that are, in particular, based on coverage of the entire second workpiece portion by means of the second adaptation strategy, and subsequent shortening of the preliminary path segments in the second edge section. Shortening of the preliminary path segment(s) may be based on at least one boundary curve that is superimposed on the first workpiece portion and/or the second workpiece portion. Accordingly, the method may initially comprise an adaptation of path segments to the geometry of the relevant workpiece portion, wherein such adaptation does not yet have to take into account the fact that a transition section is to be determined and edge sections are to be omitted. The adaptation can thus be performed easily and reliably. The method may then include specific omission of the edge sections by modifying the path segments already determined and covering the entire workpiece portions by shortening and/or trimming them where the workpiece portions adjoin one another. After adaptation, this defines a portion for which the path segments of the transition section can subsequently be defined. As mentioned, the transition section can be chosen to overlap, meaning that boundaries of the omitted portion need not necessarily be congruent with boundaries of the transition section. The boundary curve may be determined taking into account a geometry of a connecting portion and/or a boundary line extending between the workpiece portions. The boundary curve can, for example, define a predetermined distance from the first workpiece portion and/or the second workpiece portion.

According to some embodiments, the tool may have an actual tool radius that is taken into account when determining the tool path. In some cases, determining the transition section may additionally be based on at least one tool radius that is larger than the actual tool radius. The determination of at least one boundary of the transition section may be based on at least one tool radius that is larger than the actual tool radius. Determining the edge sections may also be based on at least one tool radius that is larger than the actual tool radius. This enables easy and reliable determination of the edge sections and the transition section. In the case of multiple curved and/or geometrically complex surfaces and/or polysurfaces, for example, the method can thus be carried out with a high degree of automation because the omitted sections are reliable to detect in almost any workpiece geometries on the basis of the increased tool radius. The increase may be by a factor of at least 1.1, at least 1.2, at least 1.5, at least 2, at least 3, at least 5, or an even higher value. Determining the transition section may be based on the increased tool radius in that it is used as the basis for a calculation that defines and/or limits the extension of the first path section and the second path section. The increased tool radius helps to define those portions that can be machined by the first path section and the second path section while in particular avoiding the afore-mentioned problems of considerable engagement, strong vibration, etc. This may produce the first edge section and/or the second edge section as a remaining section, for example. In addition, this may produce the transition section; however, it should be noted that it may be configured to overlap.

According to one embodiment, starting points and/or end points of path segments of the first path section that define the first edge section are determined by determining how far the tool can be moved towards the second workpiece portion during machining of the first workpiece portion, taking into account the at least one increased tool radius. Alternatively or additionally, starting points and/or end points of path segments of the second path section that define the second edge section can be determined by determining how far the tool can be moved towards the first workpiece portion during machining of the second workpiece portion, taking into account the at least one increased tool radius. The determination of the first path section and/or the second path section based on the increased tool radius may include a collision-avoiding approach to the corresponding other workpiece portion. In particular, the increased tool radius is not used as a basis for determining a distance between path segments of the corresponding path section. Since the tool radius used is larger than the actual tool radius but is preferably only used as a basis for approaching the corresponding other workpiece portion, however not for the relative spacing of path segments, this results in an omitted edge section but complete coverage or machining in the first path section when the tool is used with the actual radius.

Generally, it should be noted that "surface" in the context of the present disclosure is not intended to be limited to mathematical surfaces. A "surface" may also be, for example, a set of triangles or other polygons in a triangle mesh or a polygon mesh.

The invention further relates to a computer program for implementing a method according to the invention. In particular, the computer program comprises program code which, when executed in a computer, causes the mentioned method steps to be performed.

The invention further relates to a computer program product comprising at least one storage medium on which program code of a computer program according to the invention is stored.

The storage medium may comprise a volatile data memory and/or a non-volatile data memory.

The invention further relates to a method for material-removing machining of a workpiece using a tool, in particular a milling tool, which, for machining, in particular in a five-axis CNC machine, for example, is guided along a tool path determined using a method according to the invention and/or using a computer program according to the invention and/or using a computer program product according to the invention.

BRIEF DESCRIPTION OF THE SEVERAL VIEWS OF THE DRAWINGS

In the following, the present invention is described by way of example with reference to the accompanying figures.

The drawing, the specification and the claims contain combinations of numerous features. The skilled person will appropriately consider the features also individually and use them in useful combinations within the scope of the claims. In the drawings:

FIG. 1 is a schematic representation of a machine tool;

FIG. 2 is a schematic perspective representation of a workpiece;

FIG. 3 is a further schematic perspective representation of a workpiece;

DETAILED DESCRIPTION OF THE INVENTION

Figure 4:
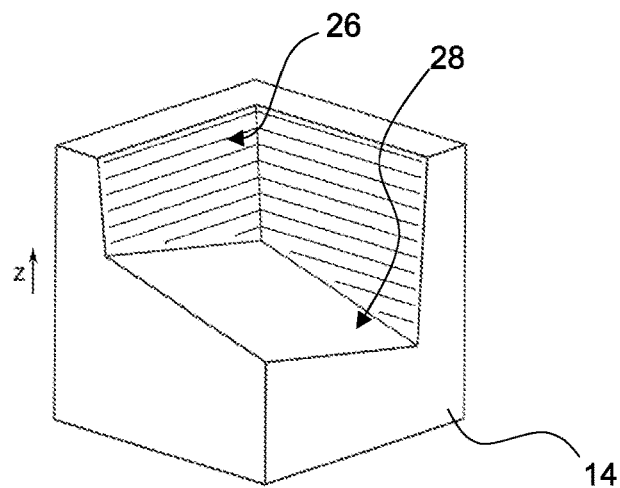
FIG. 4 is a schematic perspective representation of the workpiece with path segments adapted to a first workpiece portion.

For the following specification, reference is made to the machine tool 10 schematically shown in FIG. 1. This is to be understood purely by way of example, in particular with regard to its movable axes. In other embodiments, other machine axes and/or a different number of machine axes may be provided.

The machine tool 10 comprises a workpiece table 12 on which a workpiece 14 can be arranged and/or fastened. The workpiece 14 may be machined by means of the machine tool 10. In the exemplary case, this is a milling machine.

The machine tool 10 further comprises a machining unit 16 having a tool 18 for machining the workpiece 14. In the case illustrated, the machining unit 16 comprises, for example, a tool spindle. In the illustrated exemplary case, the tool 18 is a milling tool, in particular a ball-end milling cutter. Machining is performed by guiding the tool 18 along a tool path. This is described in more detail below. Along the tool path, the tool 18 is at least temporarily in engagement with material to be removed from the workpiece 14, which results in a target geometry of the workpiece 14 being machined.

The machine tool 10 comprises multiple axes and/or N axes, for example 5 axes. For illustration purposes, for example, the workpiece table 12 defines two rotary axes A, C, and the machining unit 16 defines three linear axes X, Y, Z. However, other configurations are possible.

The machine tool 10 further comprises a control unit 20 that may issue control commands to the N different machine axes. The machine tool 10 is in particular a CNC machine, and accordingly the control commands may be NC commands.

Furthermore, a CAM system 22 is provided. In many embodiments, such system is not part of the machine tool 10 but may operate independently of the machine. By means of the CAM system 22, a machining path may be generated on the basis of CAD data of the workpiece 14 and/or its target geometry, from which control commands for the machine tool 10 and/or its control unit 20 may be generated during post-processing in a generally known manner.

An exemplary computer program product may include a storage medium 58 that may be part of a CAM system 22 and/or can be used with such system. The storage medium may store program code of a computer program that includes instructions which, when executed on a computer, cause the below method for determining a tool path for material-removing machining of the workpiece 14 to be implemented.

FIGS. 2 and 3 are schematic perspective views of a workpiece 14. The workpiece 14 has a plurality of surfaces and/or workpiece portions having different spatial orientations. In the following, a first workpiece portion 26 and a second workpiece portion 28 that are immediately adjacent to one another are particularly striking. For clarity, the workpiece portions 26, 28 are shown as plane surfaces. However, it is to be understood that the workpiece portions 26, 28 may be curved and/or may comprise a plurality of partial surfaces. As an example, the first workpiece portion 26 comprises two plane surfaces that are connected to one another, for example, through an inner edge and/or an inner connecting portion. For the following specification, however, only one of these surfaces could alternatively be considered as the first workpiece portion 20.

The first workpiece portion 26 is a steep portion relative to a spatial axis z. A surface normal n of the first workpiece portion 26 forms a wide angle with the spatial axis z. Alternatively or additionally, a surface normal on the other partial surface of the workpiece portion 26 could be considered in this example. The second workpiece portion 28 is a flat portion relative to the spatial axis z. Its surface normal n' forms a narrow angle with the spatial axis z. To categorize surfaces as steep or flat, a critical angle can be used, for example an angle of 30°. In the illustrated case, the surface normal n of the first workpiece portion 26 is inclined accordingly by more than the critical angle, whereas the surface normal n' of the second workpiece portion 28 is inclined by less than the critical angle. As explained above, two different critical angles may be used.

If workpiece portions are considered that differ from plane surfaces, a surface normal may be considered for each contact/touch point of the tool 18 with the workpiece 14 for categorization. In the illustrated case of the flat workpiece portions 26, 28, such surface normals are constant throughout the corresponding workpiece portion 26, 28.

Figure 5:
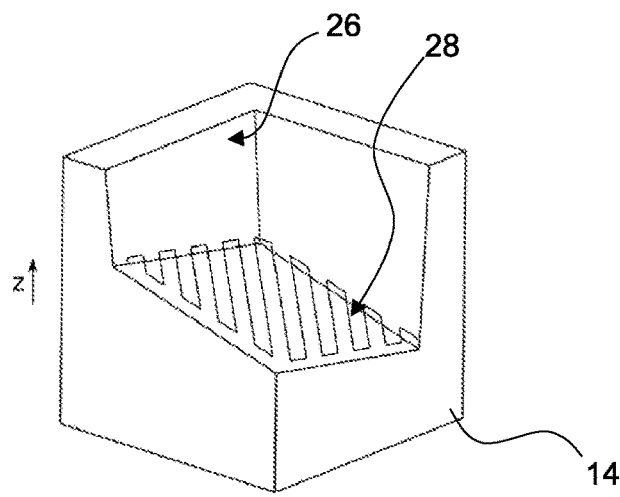
FIG. 5 is a schematic perspective representation of the workpiece with path segments adapted to a second workpiece portion.
Figure 6:
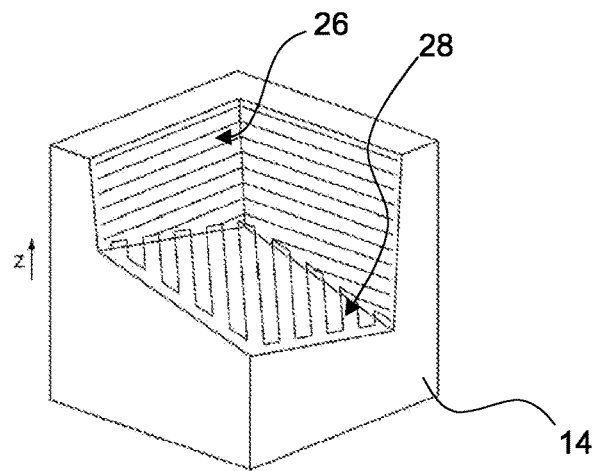
FIG. 6 is a schematic perspective representation of the workpiece with path segments adapted to the first and second workpiece portions.

FIGS. 4 to 6 illustrate a conventional adaptation of a tool path to a geometry of the workpiece 14 in an area of the two workpiece portions 26, 28. As can be seen in FIG. 4, adaptation to steep workpiece portions is carried out plane by plane. The path segments obtained, shown as solid lines, extend as far as possible to the edges of the steep workpiece portions. As further shown in FIG. 5, projection-based adaptation is used for flat workpiece portions. In the shown example, the projection-based adaptation is based on the projection of a zigzag pattern. Again, the path segments obtained extend as far as possible to the edge of the workpiece portions concerned. Thus, the overall result is the tool path shown in FIG. 6, which covers the first workpiece portion 26 and the second workpiece portion 28. The path segments obtained extend directly to an inner edge and/or a concave area between the workpiece portions 26, 28, "directly" in this context describing an approach to the extent possible according to the milling cutter radius. There, when the tool moves along connecting segments and/or approaches and/or moves along path segments, in particular also along the actual path segments, considerable engagement of the tool 18 and/or major material engagement may occur, which may come along with the quality problems as explained above.

Figure 7:
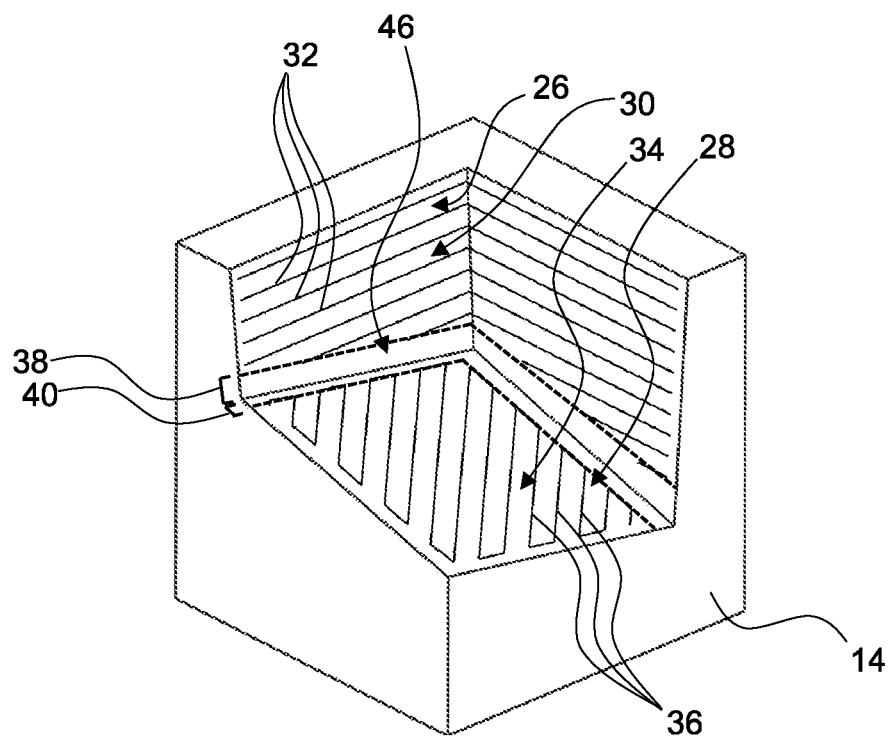
FIG. 7 is a schematic perspective representation of the workpiece with first and second path sections adapted to the first and second workpiece portions.
Figure 8:
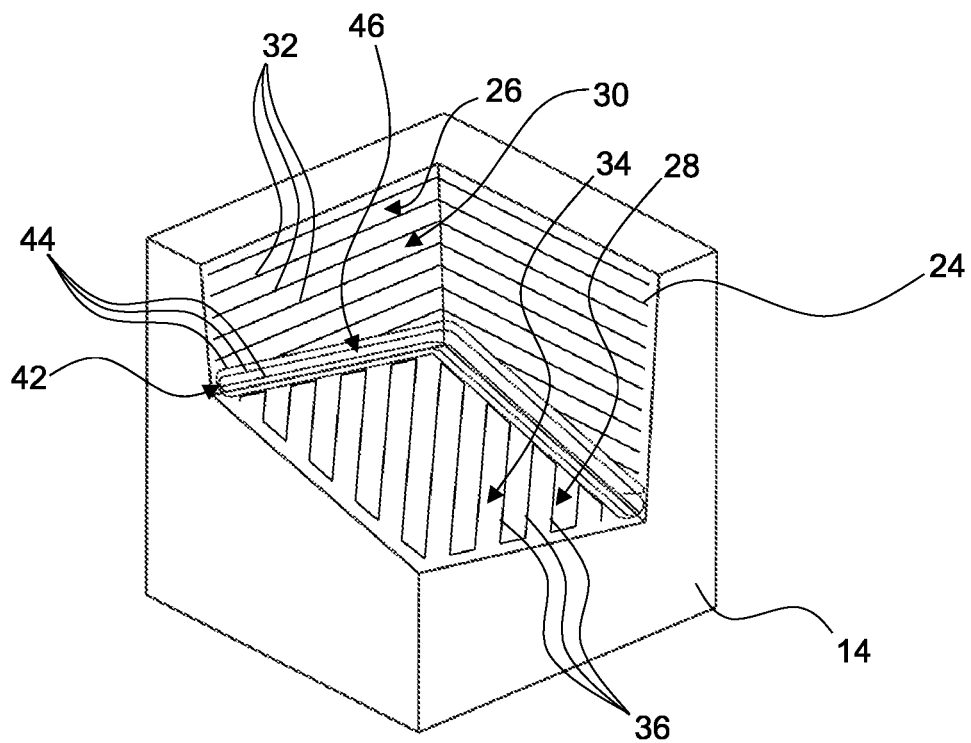
FIG. 8 is a schematic perspective representation of the workpiece with first and second path sections adapted to the first and second workpiece portions and with a transition section.

In contrast, FIGS. 7 and 8 illustrate the result of a method described herein. A tool path 24 determined using this method comprises a first path section 30 for machining the first workpiece portion 26. Path segments 32 of the first path section 30, only some of which have reference signs, are adapted to the first workpiece portion 26 using a plane-based method. The tool path 24 further includes a second path section 34 for machining the second workpiece portion 28 which includes path segments 36, only some of which have reference signs. They are adapted to the second workpiece portion 28 using a projection-based method.

As mentioned above, the adaptation strategies in other embodiments may also differ in that different tool inclinations are used, especially while the path segments are calculated using the same method.

As illustrated in FIG. 7 by way of example, the method provides that the path sections 30, 34 are determined in such a way that the respective workpiece portion 26, 28 is not covered by path segments 32, 30 in a first edge section 38 or a second edge section 40, respectively, although path segments could in principle be adapted to the edge sections 38, 40 using the respective adaptation strategy. Hence, there are no path segments of the first path section 30 or the second path section 34 in a connecting portion 46 of the two workpiece portions 26, 28. Thus, in particular, the area is omitted in which material engagement would otherwise be major, as explained above with reference to FIGS. 4 to 6.

The method further provides for determining a transition section 42 of the tool path 24 that covers the edge sections 38, 40 such that the transition section 42 and the two path sections 30, 34 or their respective path segments 32, 36, 44 cover the entire first workpiece portion 26 and the entire second workpiece portion 28.

In the case shown as an example, a spiral strategy is chosen in the transition section 42. Due to the spiral filling path of the transition section 42, no approach/retraction movements are required within the transition section. In the illustrated case, the path segments 44 of the transition section 42 run from the outside to the inside although machining in the reverse direction is possible. However, the transition section 42 can also be determined by means of other adaptation strategies, wherein, in particular, a different adaptation strategy is used than in the first path section 30 and the second path section 34. The path segments 44 of the transition section 42 will be discussed again below in connection with FIGS. 11 and 12.

Figure 9:
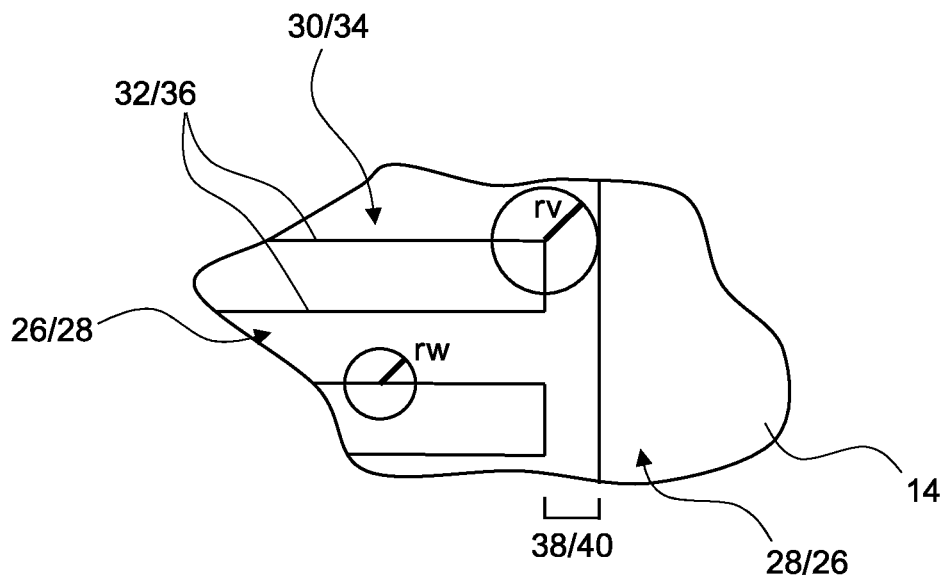
FIG. 9 is a schematic top view of a portion of the workpiece, illustrating a first method for determining omitted edge sections.

Different strategies can be used to determine the edge sections 38, 40. A first possible strategy is illustrated in FIG. 9. It is understood that the described procedure can be used both for the first edge section 38 and for the second edge section 40, and for the first workpiece portion 26 and/or the second workpiece portion 28, respectively. In FIG. 9, this is illustrated by the use of a pair of reference signs.

According to this approach, the determination of the path segments 32/36 of the corresponding path section 30/34 is basically based on an actual radius rw of the tool 18. To determine the edge section 38/40, however, a starting point and/or an end point of a particular path segment 32/36 is determined on the basis of an increased tool radius rv. This can, for example, be larger than the actual radius rw by a factor of 1.5, a factor of 2, a factor of 3 or any other factor. When the increased radius rv is used, the starting point and/or the end point of a path segment 32/36 are further away from an edge of the relevant workpiece portion 26/28 than would be required on the basis of the actual tool radius rw and/or would be the case according to the actual tool radius rw. This is the result of a simple check of whether or not the larger tool, on which the calculation is based, would collide with the adjacent workpiece portion 28/26. By determining all path segments 32/36 of the relevant path section 30/34 in accordance with the increased tool radius rv, an overall omitted edge section 38/40 is obtained as provided by the method.

Figure 10:
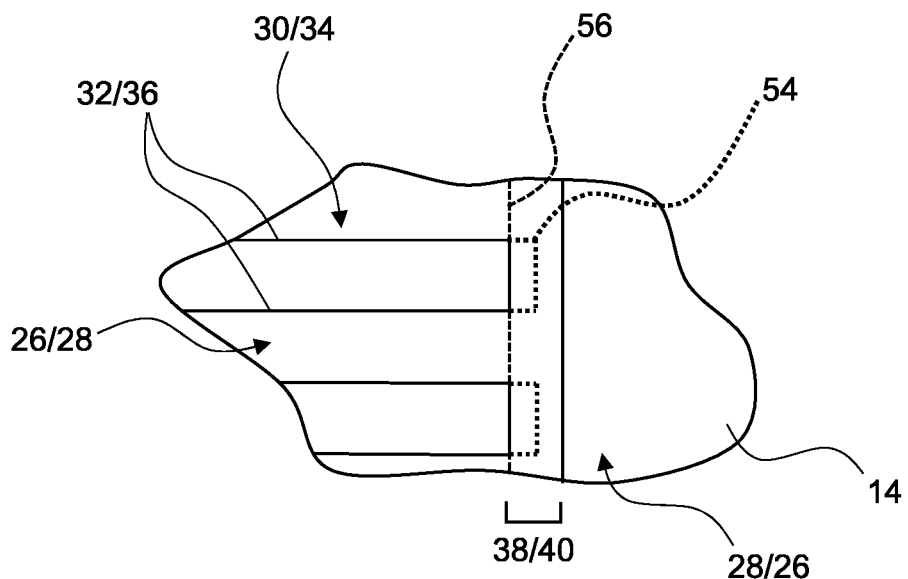
FIG. 10 is a schematic top view of a portion of the workpiece, illustrating a second method for determining omitted edge sections.

An alternative procedure is shown in FIG. 10. Here, path segments 32/36 are first determined for the entire workpiece portion 26/28 based on the actual tool radius rw, i.e. up to its edges. In this way, preliminary path segments 54 are obtained. Based on these preliminary path segments 54, a boundary curve 56 is used which is superimposed on the relevant workpiece portion 26/28. According to this boundary curve 56, the preliminary path segments 54 are shortened to obtain the final path segments 32/36. The boundary curve 56 can, for example, run parallel to a surface of the adjacent workpiece portion 28/26 and/or parallel to an edge of the workpiece portion 26/28 under consideration and/or at a specified distance therefrom and, if applicable, also follow a non-linear course. This also helps to obtain an omitted edge section 38/40.

According to yet another embodiment, the path segments 32/36 are determined from the beginning only up to a certain distance relative to an edge of the concerned workpiece portion 26/28, i.e. without using a boundary curve but by checking calculated distance values of path segment points.

Figure 11:
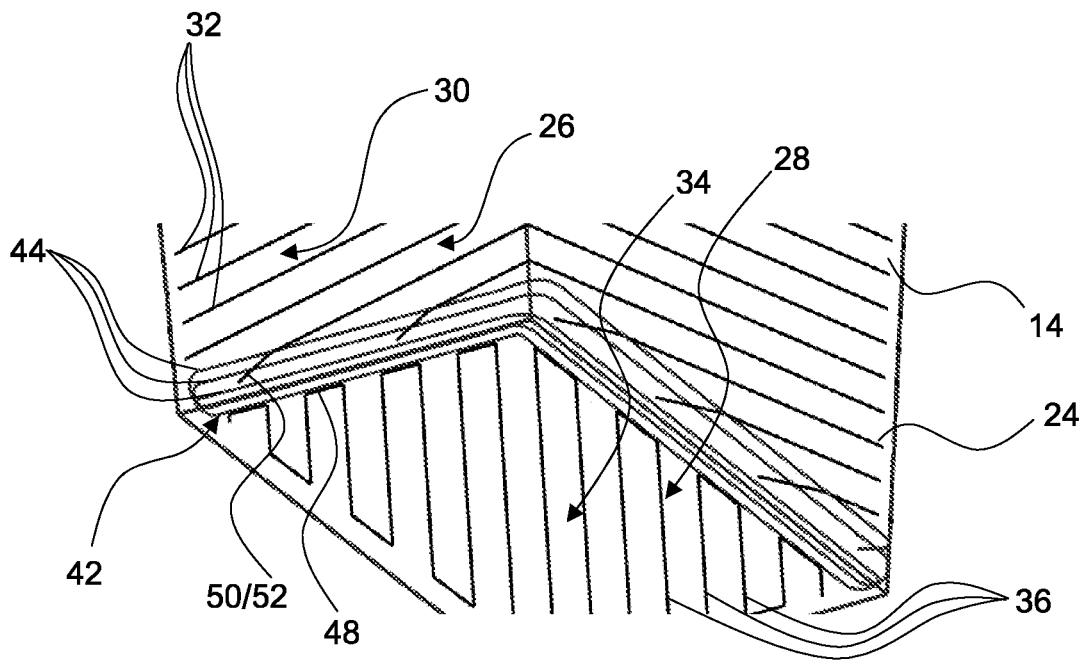
FIG. 11 is a schematic perspective representation of a portion of the workpiece with an adapted tool path including first retraction segments.
Figure 12:
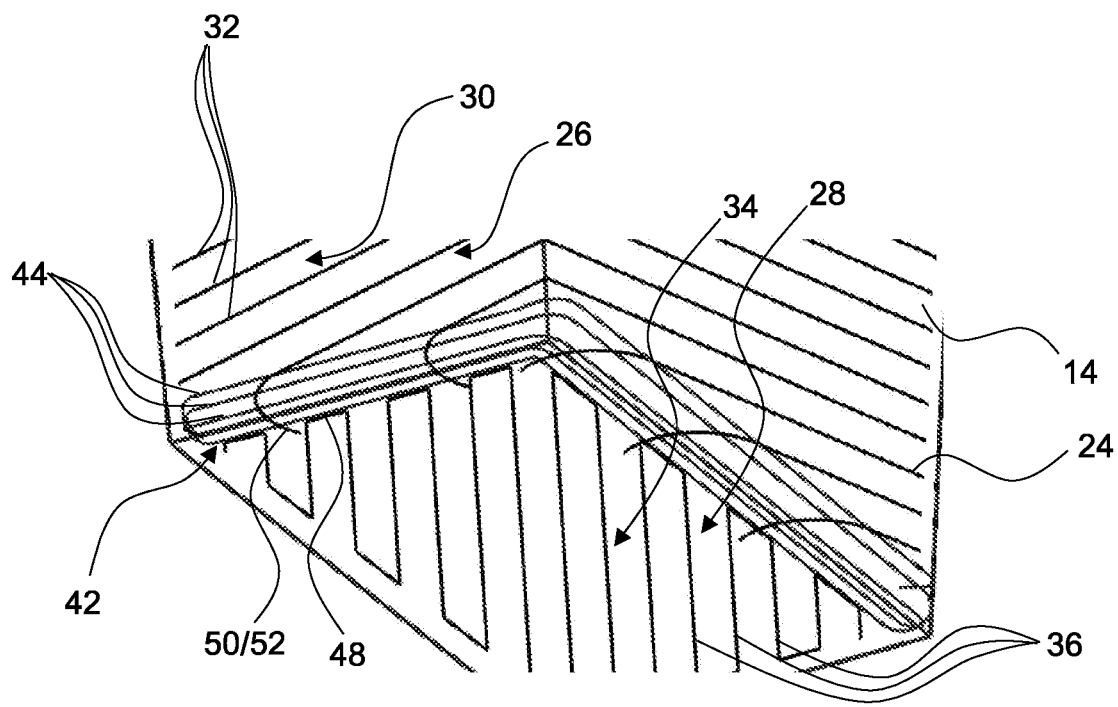
FIG. 12 is a schematic perspective representation of a portion of the workpiece with an adapted tool path including second retraction segments.

FIGS. 11 and 12 are enlarged sections of the workpiece 14. As an example, the transition section 42 is chosen such that its path segments 44 are adjacent to the path segments 32, 36 of the first path section 30 and the second path section 34, wherein the path segments 44 overlap approach and/or retraction segments. The tool path 24 provides that the transition section 42 is the last to be approached by the tool 18. Because of the space gained by specifically omitting the edge sections 38, 40, comparatively sweeping movements can be made to approach or depart from path section 30, for example. For example, approach/retraction segments having only a slight curvature can be used, as illustrated in FIG. 11, or long, arc-shaped path segments, as illustrated in FIG. 12. This results in smooth tool movements, thus making machine inaccuracies less significant, preventing milling marks, and avoiding undesirably major material engagement. In the illustrated cases, straight connecting segments are used between the path segments 36. In other embodiments, curved connecting segments may be used that define smooth movements and/or along which temporary lifting may occur.

Figure 13:
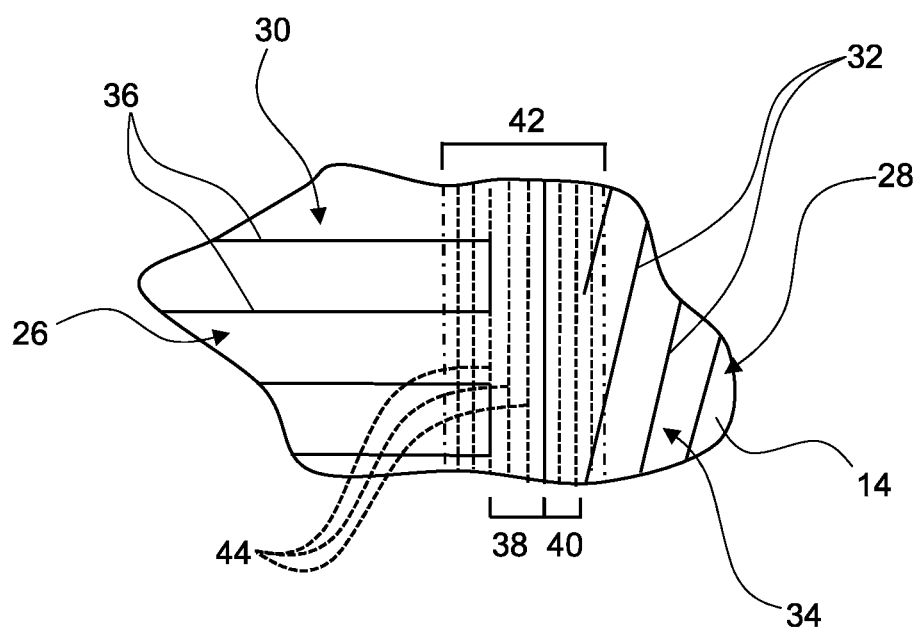
FIG. 13 is a schematic perspective representation of a portion of a workpiece with a tool path including a transition section chosen to overlap with path sections.

FIG. 13 illustrates another embodiment in which the path segments 44 (indicated by dashed lines) of the transition section 42 (indicated by dashed and dotted lines) overlap the path segments 32, 36 of the first path section 30 and the second path section 34. As can be seen, the transition section 42 thus extends beyond the edge sections 38, 40. In addition, the path segments 44 of the transition section 42 may be chosen such that they are gradually lifted from the workpiece 14 towards the edge of the transition section 42. In the case shown, lifting takes place outside the edge sections 38, 40. The transition section 42 thus enables smoothing in the boundary section of the transition section 42 and thus removal/smoothing of marks in the material created during machining according to the first path section 30 and/or the second path section 34.

The tool path 24 may provide that the transition section 42 is the last to be approached by the tool 18. The transition section 42 thus enables grinding in the edge section of the transition section 42 and thus removal/grinding of marks in the material created during machining according to the first path section 30 and/or the second path section 34.

Figure 14:
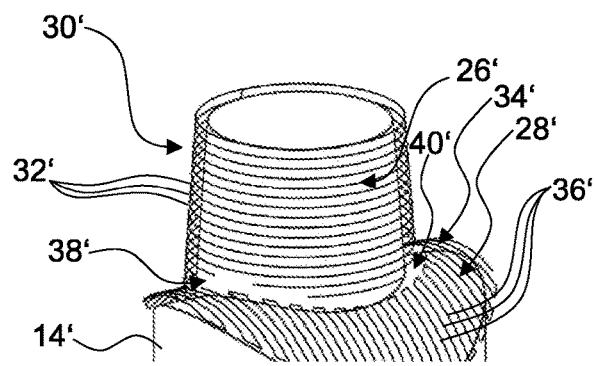
FIG. 14 is a schematic perspective representation of a further workpiece with first and second path sections adapted to first and second workpiece portions.
Figure 15:
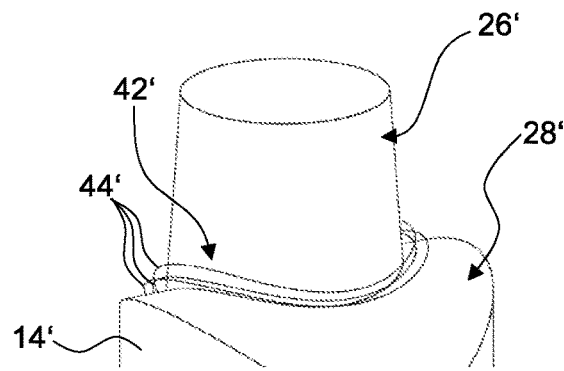
FIG. 15 is a schematic perspective representation of the further workpiece with a transition section adapted to a connecting portion.
Figure 16:
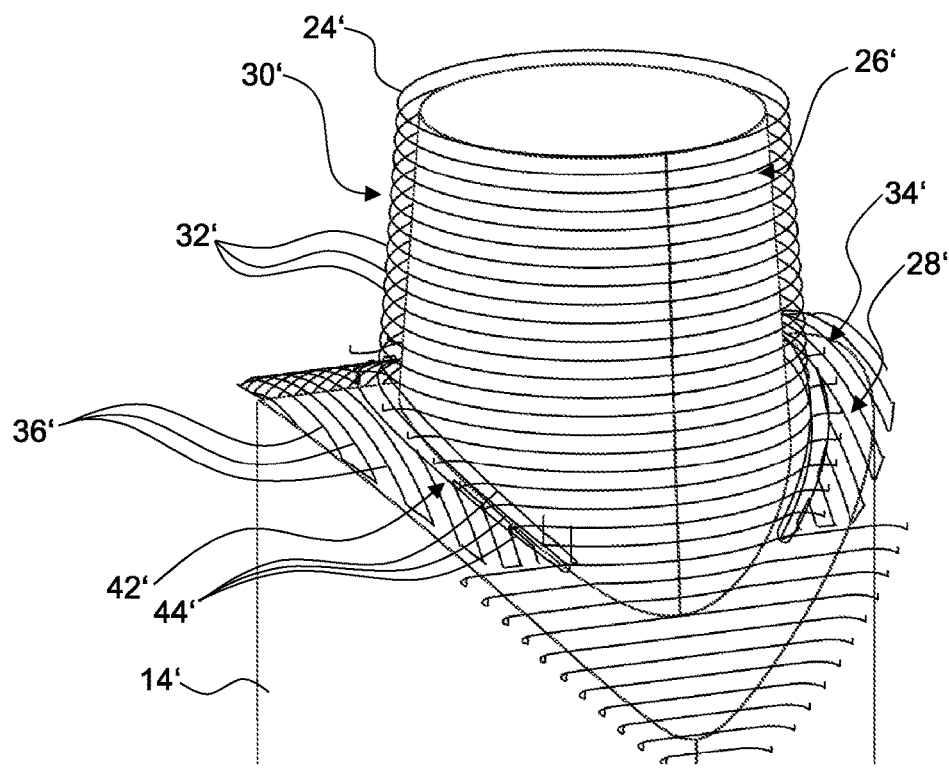
FIG. 16 is a schematic perspective representation of the further workpiece with first and second path sections adapted to first and second workpiece portions and with the transition section.

FIGS. 14 to 16 show a further machining situation for a different workpiece 14'. For ease of understanding, the same reference signs are used as above; in FIGS. 14 to 16, they have inverted commas. In principle, reference can be made to the above description of the corresponding objects/elements.

The further workpiece 14' includes a first workpiece portion 26' comprising a conical portion of the workpiece 14' and a steep area of a saddle-shaped portion of the further workpiece 14' disposed below the conical portion. In addition, the further workpiece 14' includes a second workpiece portion 28' comprising a flat area of the saddle-shaped portion. The workpiece portions 26', 28' can be obtained by comparison with a critical angle as described above. FIG. 16 clearly shows how such a categorization results in a boundary between the workpiece portions 26', 28' which is located within a contiguous surface of the workpiece 14'.

As in the example described above, a first path section 30' and a second path section 34' are determined by specifically omitting edge sections 38', 40' and using different adaptation strategies. A transition section 42' is determined such that the path segments 32', 36', 44' of the path sections 30', 34' and the transition section 42' collectively cover the entire two workpiece portions 28', 30' or define/effect their complete machining. As can be seen in FIG. 16, the spiral filling paths of the transition section 42' are not completely circumferential at a rear side of the workpiece 14' since the steep first workpiece portion 26' runs continuously from top to bottom.

Figure 17:
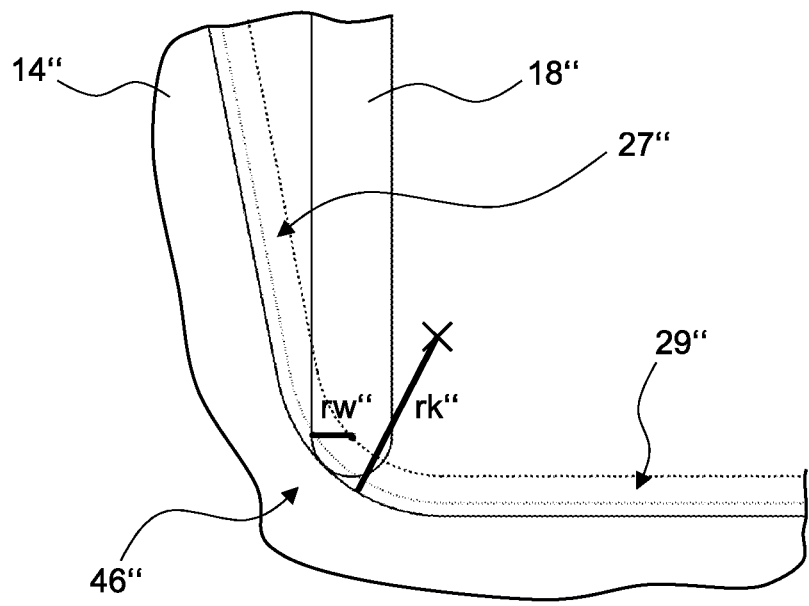
FIG. 17 is a schematic representation of a first connecting portion of a workpiece.
Figure 18:
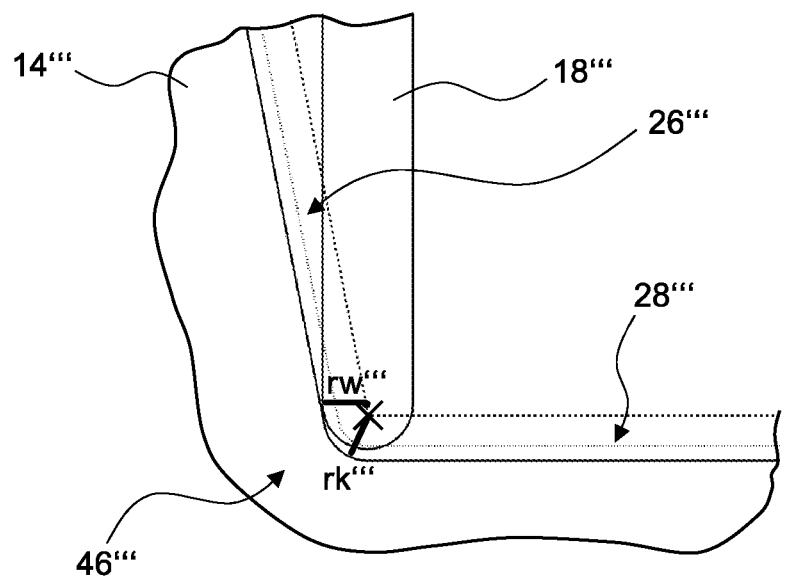
FIG. 18 is a schematic representation of a second connecting portion of a workpiece.

Depending on the application, it may be appropriate to use the described procedure only if the workpiece geometry defines surfaces and transitions that would otherwise be difficult to machine at sufficient quality. This is illustrated by FIGS. 17 and 18. For convenience, the reference signs used above for corresponding objects are used again; to be easy to distinguish, they have two or three inverted commas. The solid line in each case illustrates the workpiece contour, the dotted line illustrates a material yet to be removed, and the dashed line illustrates a milling path along which the tool moves. In the example of a ball-end milling cutter, a ball center of the tool moves along this milling path.

The workpiece 14" according to FIG. 17 comprises a connecting portion 46" between portions 27", 29" of a workpiece surface. The connecting portion 46" is concavely curved and has a curvature radius rk" that is considerably larger than a radius rw" of the tool 18". It is therefore readily possible to machine the workpiece without the use of a transition section and without machining marks forming in an area of the connecting portion 46". Obviously, the engagement of the tool 18" is acceptable.

In contrast, the workpiece 14' according to FIG. 18 has a connecting portion 46' with a significantly stronger curvature which can be described by a curvature radius rk'" that approximately corresponds to a tool radius rw'". Engagement of the tool 18' in an area of the connecting portion 46' would be extreme, as shown by the major engagement with the material (cf. dotted line). The resulting major material engagement could reduce machining quality.

The method can therefore comprise comparing a geometrical parameter of the tool 18"/18' with a geometrical parameter of the workpiece 14"/14', in the present case the connecting portion 46"/46". In the case illustrated by way of example, a curvature radius of the connecting portion 46"/46' is compared with the tool radius rw"/rw'". Appropriately, a threshold value specified by a user is also taken into account, which, for example, represents a prefactor for the comparison. If the curvature radius is smaller than or equal to the threshold value multiplied by the tool radius rw"/rw'", it is concluded that there is a situation as illustrated in FIG. 18 and that a transition section must be defined. This is where the specific omission of edge sections and the superimposition of a transition section as described above come in. The user can, for example, specify that the method is used if the curvature radius rw" of the connecting portion 46" is smaller than twice or one and a half times the tool radius rw".

Otherwise, it is not necessary to define a transition section (cf., for example, the case according to FIG. 17). Then the geometrical parameters considered differ so significantly that no quality problems are to be expected during machining.

If rather than a ball-end milling cutter a radius milling cutter or any other tool with a curved cutting edge is used, instead of the tool radius or in addition to it, the described comparison can be made on the basis of a geometrical parameter describing the cutting edge of the tool.

Figure 19:
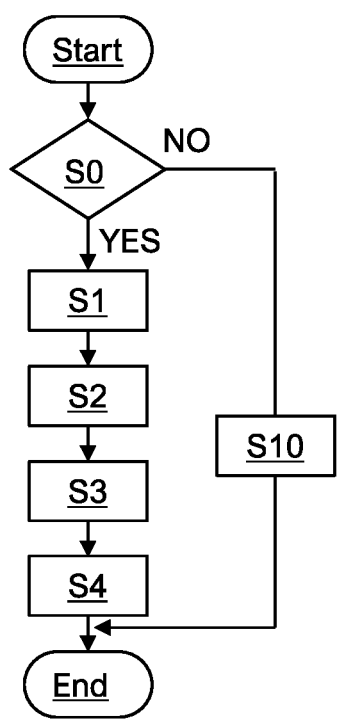
FIG. 19 is a schematic flow chart of a method for determining a machining path.

A schematic flow chart of a method for determining a tool path for material-removal machining of a workpiece is shown in FIG. 19. As an optional step S0, the method can comprise comparing a geometrical parameter of the workpiece with a geometrical parameter of the tool, as described above by way of example using FIGS. 16 and 17. If the comparison shows that it is not necessary to define a transition section, the workpiece is machined beyond an existing connecting portion in a step S10. If, however, the comparison shows that it is useful to divide the workpiece, the method is implemented with the specific omission of the edge sections.

In a step S1, different workpiece portions can be determined. This can be done, for example, by comparing surface normals with a critical angle, as described.

In a step S2, a first path section of a tool path is determined such that path segments of the first path section cover a first workpiece portion except for a first edge section.

In a step S3, a second path section of the tool path is determined such that path segments of the second path section cover a second workpiece portion except for a second edge section.

In a step S4, a transition section of the tool path is determined that covers the first edge section and the second edge section, wherein path segments of the transition section together with the path segments of the first and second path sections cover the entire workpiece portion.

As described above, steps S2 and/or S3 may include shortening preliminary path segments and/or determining path segments based on the consideration of an increased tool radius relative to an actual tool radius and/or by checking calculated distance values of path segment points.

Figure 20:
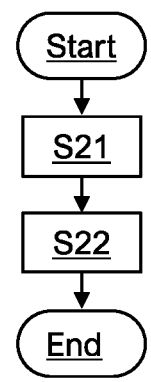
FIG. 20 is a schematic flow chart of a method for material-removing machining of a workpiece.

The tool path determined in such a method can be used in a method illustrated by the schematic flow chart of FIG. 20. In a step S21, a machining path is determined. This is done in a method according to FIG. 19. In a step S22, a workpiece is machined using a tool that is guided along the determined tool path for machining.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EEPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions or executable portions embodied therein.

It will also be understood that one or more computer-executable program code portions or instruction code for carrying out or performing the specialized operations of the present invention may be required on the specialized computer include object-oriented, scripted, and/or unscripted programming languages, such as, for example, Java, Perl, Smalltalk, C++, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A method for material-removing machining when moving a milling tool of a machine tool along a tool path, the method comprising:
providing a workpiece comprising a first workpiece portion and a second workpiece portion adjacent to the first workpiece portion, wherein the tool path comprises a first path section for machining the first workpiece portion, the first path section comprising path segments adapted to a geometry of the first workpiece portion, and wherein the tool path comprises a second path section for machining the second workpiece portion, the second path section comprising path segments adapted to a geometry of the second workpiece portion;

determining the first path section in such a way that the path segments of the first path section cover the first workpiece portion except for a first edge section that is omitted by the path segments of the first path section;

determining the second path section in such a way that the path segments of the second path section cover the second workpiece portion except for a second edge section that is omitted by the path segments of the second path section; and determining a transition section of the tool path, comprising path segments covering the first edge section and the second edge section, wherein the path segments of the first path section, the second path section and the transition section collectively cover the entire first workpiece portion and the entire second workpiece portion.

2. The method of claim 1, wherein at least one selected from the group consisting of: (i) the first workpiece portion is a steep portion relative to a spatial axis, the surface normals of which are inclined by more than a first critical angle relative to the spatial axis at at least one selected from the group consisting of (a) contact points of the tool and (b) touch points of the tool, and (ii) the second workpiece portion is a flat portion, the surface normals of which are inclined by less than a second critical angle relative to the spatial axis at at least one selected from the group consisting of (a) contact points of the tool and (b) touch points of the tool.

3. The method of claim 1, further comprising comparing at least one geometrical parameter of the tool with a geometrical parameter of the first workpiece portion and of the second workpiece portion.

4. The method of claim 1, further comprising comparing a radius of the tool with a curvature radius, describing a connecting portion of the first workpiece portion and of the second workpiece portion.

5. The method of claim 4, wherein the comparison is based on at least one threshold value set by a user.

6. The method of claim 1, further comprising:
adapting the first path section to the geometry of the first workpiece portion using a first adaptation strategy, the first adaption strategy comprising at least one selected from the group consisting of plane-based path segments or projection-based path segments;
adapting the second path section to the geometry of the second workpiece portion using a second adaptation strategy, the second adaption strategy comprising at least one selected from the group consisting of plane-based path segments or projection-based path segments; and
wherein the second adaptation strategy is different from the first adaptation strategy by at least one selected from the group consisting of:
(i) the type of generated path segments; and
(ii) the orientation of the tool along the generated path segments.

7. The method of claim 6,
wherein the first adaptation strategy provides path segments that are plane-based such that machining in the first path section is performed plane by plane and/or wherein the second adaptation strategy provides path segments that are projection-based such that the second path section is based on a projection of a path pattern onto the second workpiece portion.

8. The method of claim 6, further comprising at least one selected from the group consisting of:
(i) determining the first path section by determining preliminary path segments based on coverage of the entire first workpiece portion using the first adaptation strategy and subsequent shortening the preliminary path segments in the first edge section; and
(ii) determining the second path section by determining preliminary path segments based on coverage of the entire second workpiece portion using the second adaptation strategy and subsequent shortening the preliminary path segments in the second edge section.

9. The method of claim 7, wherein the shortening of the preliminary path segments is based on at least one boundary curve that is superimposed on at least one selected from the group consisting of: (i) the first workpiece portion and (ii) the second workpiece portion.

10. The method of claim 1, further comprising:
determining at least one selected from the group consisting of: (i) connecting segments, (ii) approach segments and (iii) retraction segments, in each case that are at least partially included in the transition section.

11. The method of claim 1,
wherein the transition section is reached after at least one selected from the group consisting of: (i) the first path section and (ii) the second path section, when the tool is moved along the tool path.

12. The method of claim 1, further comprising:
determining the transition section in such a way that its path segments at least partially overlap at least one selected from the group consisting of: (i) the first path section and (ii) the second path section.

13. The method of claim 11, wherein the path segments of the transition section are determined in such a way that they are gradually lifted from the workpiece where they overlap at least one selected from the group consisting of: (i) the first path section and (ii) the second path section.

14. The method of claim 1, further comprising:
determining the path segments of the transition section in such a way that they describe a spiral filling path for the transition section.

15. The method of claim 1,
wherein the tool has an actual tool radius that is taken into account when determining the tool path, and
wherein the determination of the transition section is based on at least one tool radius that is larger than the actual tool radius.

16. The method of claim 15, further comprising at least one selected from the group consisting of:
(i) wherein at least one selected from the group consisting of (a) starting points of path segments of the first path section defining the first edge section and (b) end points of path segments of the first path section defining the first edge section, are determined by determining how far the tool is movable towards the second workpiece portion during machining of the first workpiece portion, taking into account the at least one increased tool radius; and
(ii) wherein at least one selected from the group consisting of (a) starting points of the second path section defining the second edge section and (b) end points of path segments of the second path section defining the second edge section, are determined by determining how far the tool is movable towards the first workpiece portion during machining of the second workpiece portion, taking into account the at least one increased tool radius.

17. A system for machining a workpiece having a first workpiece portion and a second workpiece portion adjacent to the first workpiece portion, the system comprising:
a machine tool comprising a milling tool, the machine tool structured to move the milling tool along a tool path, wherein the tool path comprises a first path section for machining the first workpiece portion, the first path section comprising path segments adapted to a geometry of the first workpiece portion, and wherein the tool path comprises a second path section for machining the second workpiece portion, comprising path segments adapted to a geometry of the second workpiece portion;
a non-transitory memory device with computer-readable program code stored thereon;
a processing device operatively coupled to the non-transitory memory device, wherein the processing device is configured to execute the computer-readable program code to:
determine the first path section in such a way that the path segments of the first path section cover the first workpiece portion except for a first edge section that is omitted by the path segments of the first path section;
determine the second path section in such a way that the path segments of the second path section cover the second workpiece portion except for a second edge section that is omitted by the path segments of the second path section; and
determine a transition section of the tool path, comprising path segments covering the first edge section and the second edge section, wherein the path segments of the first path section, the second path section and the transition section collectively cover the entire first workpiece portion and the entire second workpiece portion.

18. The system of claim 17, wherein the processing device is configured to execute the computer-readable program code to:
adapt the first path section to the geometry of the first workpiece portion using a first adaptation strategy;
adapt the second path section to the geometry of the second workpiece portion using a second adaptation strategy; and
wherein the second adaptation strategy is different from the first adaptation strategy by at least one selected from the group consisting of:
(i) the type of generated path segments; and
(ii) the orientation of the tool along the generated path segments.

19. The system of claim 18,
wherein the first adaptation strategy provides path segments that are plane-based such that machining in the first path section is performed plane by plane and/or
wherein the second adaptation strategy provides path segments that are projection-based such that the second path section is based on a projection of a path pattern onto the second workpiece portion.

20. The system of claim 18, wherein the processing device is configured to execute the computer-readable program code to at least one selected from the group consisting of:
(i) determine the first path section by determining preliminary path segments based on coverage of the entire first workpiece portion using the first adaptation strategy and subsequent shortening the preliminary path segments in the first edge section; and
(ii) determine the second path section by determining preliminary path segments based on coverage of the entire second workpiece portion using the second adaptation strategy and subsequent shortening the preliminary path segments in the second edge section.

21. The system of claim 20, wherein the shortening of the preliminary path segments is based on at least one boundary curve that is superimposed on at least one selected from the group consisting of: (i) the first workpiece portion and (ii) the second workpiece portion.

22. The system of claim 17, wherein the tool has an actual tool radius that is taken into account when determining the tool path;
wherein the determination of the transition section is based on at least one tool radius that is larger than the actual tool radius; and
wherein the processing device is configured to execute the computer-readable program code to at least one selected from the group consisting of:
(i) wherein at least one selected from the group consisting of (a) starting points of path segments of the first path section defining the first edge section and (b) end points of path segments of the first path section defining the first edge section, are determined by determining how far the tool is movable towards the second workpiece portion during machining of the first workpiece portion, taking into account the at least one increased tool radius; and
(ii) wherein at least one selected from the group consisting of (a) starting points of path segments of the second path section defining the second edge section and (b) end points of path segments of the second path section defining the second edge section, are determined by determining how far the tool is movable towards the first workpiece portion during machining of the second workpiece portion, taking into account the at least one increased tool radius.

* * * * *